United States Patent [19]
Asari et al.

[11] Patent Number: 4,740,147
[45] Date of Patent: Apr. 26, 1988

[54] ULTRA-HIGH PRESSURE SOLID PRESSING MACHINE

[75] Inventors: Akira Asari, Osaka; Shiro Sakamoto, Hyogo, both of Japan

[73] Assignee: Kabushiki Kaisha Kobe Seiko Sho, Kobe, Japan

[21] Appl. No.: 839,032

[22] Filed: Mar. 12, 1986

[51] Int. Cl.$^4$ .............................................. B29C 33/02
[52] U.S. Cl. ..................... 425/77; 425/412; 425/344; 425/412; 425/DIG. 13
[58] Field of Search ................. 425/77, DIG. 13, 412, 425/77, 78, 344, 402, 352; 264/27; 219/78.01, 78.02, 382, 394, 483, 486, 487, 497, 243

[56] References Cited

U.S. PATENT DOCUMENTS

| | | | |
|---|---|---|---|
| 1,685,647 | 9/1928 | Shroyer | 219/394 |
| 2,944,289 | 7/1960 | Hall | 425/77 |
| 3,031,269 | 4/1962 | Dovenkerk | 425/77 |
| 3,075,245 | 1/1963 | Bundy | 425/77 |
| 3,088,170 | 5/1963 | Strong | 425/77 |
| 3,172,156 | 3/1965 | Belden | 425/77 |
| 3,311,734 | 3/1967 | Petersen | 219/50 |
| 3,543,347 | 12/1970 | Ishizuka | 425/77 |
| 3,546,413 | 12/1970 | Ishizuka | 425/77 |
| 3,690,805 | 9/1972 | Kopicko | 425/352 |
| 3,727,028 | 4/1973 | Kuratomi | 425/77 |
| 4,056,341 | 11/1977 | Moore | 425/77 |

FOREIGN PATENT DOCUMENTS 46-26204 7/1971 Japan .................................. 219/149

OTHER PUBLICATIONS

"High Pressure Experimental Technology and its Application", 2nd Edition, Published by Maruzen K.K., Oct. 30, 1976, pp. 267-270.

Primary Examiner—Willard E. Hoag
Attorney, Agent, or Firm—Oblon, Fisher, Spivak, McClelland & Maier

[57] ABSTRACT

An ultra-high pressure solid pressing machine of the type having a pair of upper and lower platens mounted in a press frame and movable relatively toward and away from each other, a mold unit interposed between the upper and lower platens and including at least a cylindrical cavity for receiving raw material therein, upper and lower conical surfaces formed around the upper and lower ends of the cylindrical cavity, and upper and lower anvils fitted respectively in the upper and lower conical surfaces through a gasket to compress the raw material in the cylindrical cavity under an ultra-high pressure, characterized in that the pressing machine includes a plurality of mold units stacked one on another between the upper and lower platens through insulators with axes of cylindrical cavities of the respective mold units being in vertical alignment with each other and a current supply control separately connected to the mold units.

1 Claim, 5 Drawing Sheets

ULTRA-HIGH PRESSURE SOLID PRESSING MACHINE

BACKGROUND OF THE INVENTION

1. Field of the Invention

This invention relates to an ultra-high pressure solid pressing machine, which is suitable for application to the production of artificial diamonds, CBN and the like.

2. Description of the Prior Art

Technology regarding the ultra-high pressure press to be used for production of artificial diamonds and CBN is discussed on pages 267 to 270 of "High Pressure Experimental Technology and it's Application," second edition, published by Maruzen K. K. on Oct. 30, 1976.

According to conventional technology, one set of molds is mounted on a press, and a pressure of 30,000–100,000 atms. is applied to the material which is held in a cylinder formed at the center of the mold, while heating the material to about 2000° C. by passing electric current through the mold to sinter the material under high pressure over a processing time ranging from 30 minutes to several hours.

The above-mentioned processing time is required to obtain only a product of a small size, resulting in extremely low productivity.

SUMMARY OF THE INVENTION

In view of the objectionably large press power as required by the so-called abreast type press which employs a plurality of molds side by side to increase the productivity, the present invention has as its object the provision of an ultra-high pressure solid pressing machine incorporating a plurality of mold sets in a vertically stacked form to permit to produce simultaneously a plurality of artificial diamonds or the like without increasing the press power.

According to one aspect of the present invention, there is provided an ultra-high pressure solid pressing machine of the type having a pair of upper and lower platens mounted in a press frame and movable relatively toward and away from each other, a mold unit interposed between the upper and lower platens and including at least a cylindrical cavity for receiving raw material therein, upper and lower conical surfaces formed around the upper and lower end of the cylindrical cavity, and upper and lower anvils fitted respectively in the upper and lower conical surfaces through a gasket to compress the raw material in the cylindrical cavity with an ultra-high pressure, characterized in that the press comprises a plurality of mold units being stacked one on another between the upper and lower platens through insulators with axes of the cylindrical cavities of the respective mold units in vertical alignment with each other; and current supply control means separately connected to the respective mold units.

According to another aspect of the invention, there is provided an ultra-high pressure solid pressing machine which further comprises an intermediate platen interposed between adjacent mold units to support the respective mold units from beneath in cooperation with the lower platen.

Powdery raw material is packed into the cylindrical cavity of each mold unit, and the upper and lower anvils are fitted into the conical surfaces at the upper and lower ends of the cylindrical cavity, respectively. In this state, the current supply control means start to supply current simultaneously with actuation of a pressing power generator to apply a pressure of 30,000 to 100,000 atms. to the raw material through the anvils while heating up the material to about 2000° C. to sinter the same under pressure.

The above and other objects, features and advantages of the invention will become apparent from the following description and the appended claims, taken in conjunction with the accompanying drawings which show by way of example some preferred embodiments of the invention.

DESCRIPTION OF PREFERRED EMBODIMENTS

Figure 1:
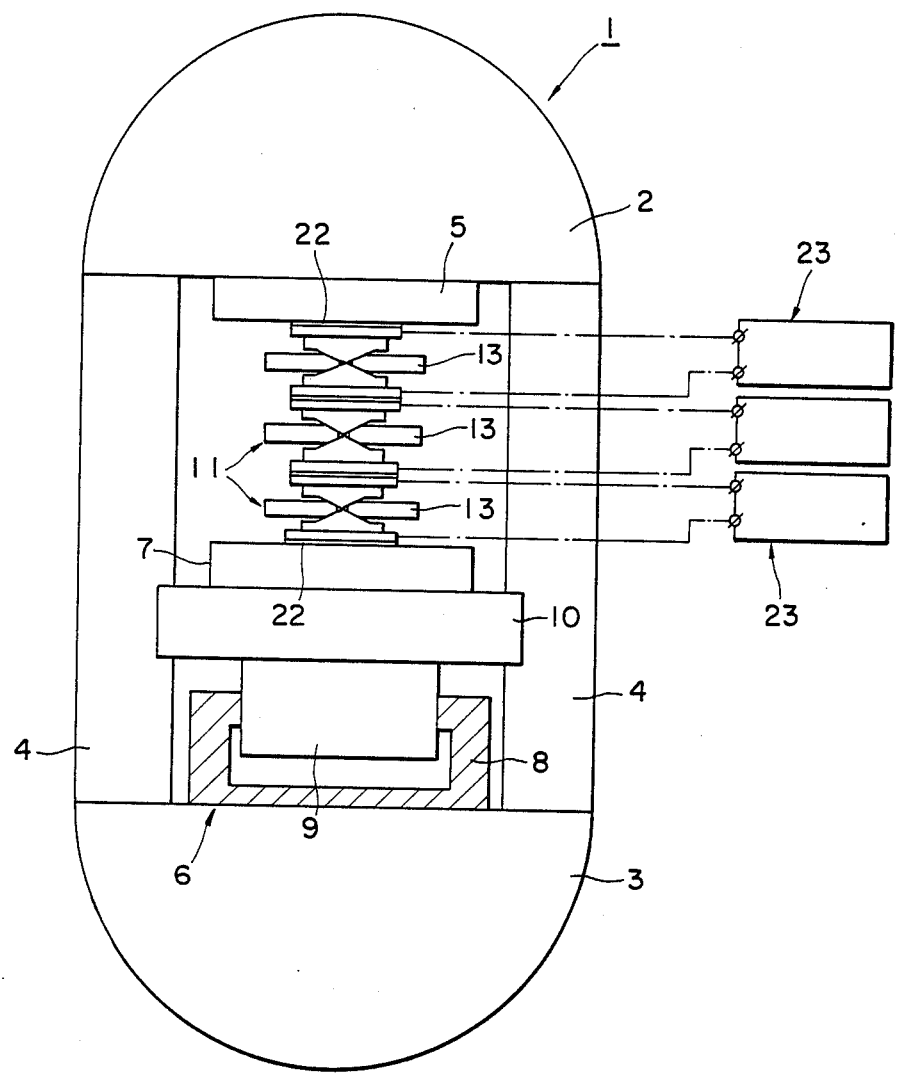
FIG. 1 is a diagrammatic front view of an ultra-high pressure solid pressing machine embodying the present invention.

Referring to FIG. 1, there is shown a press frame 1 of the winding type frame including upper and lower yokes 2 and 3 which are connected to each other by columns 4, and mounting windings on its outer periphery portion which is not shown. If desired, the press frame 1 may be a winding type frame of a different construction.

An upper platen 5 is mounted on the lower side of the upper yoke 2, while a lower platen 7 is mounted on the lower yoke 3 through a press power generator 6. The press power generator 6 is constituted by a cylinder 8 and a piston 9 which is slidably fitted in the cylinder 8 and associated with the lower platen 7 through a slide 10. Thus, the upper and lower platens 5 and 7 are vertically movable relative to each other by application of the press power.

Although the press power generator is provided in association with the lower platen in the particular embodiment shown, it may be associated with the upper platen if desired.

Between the upper and lower platens 5 and 7, a plurality of mold units 11 are vertically stacked one on another with the axes of the respective cylindrical cavities being in alignment with each other and with the press axis.

Figure 2:
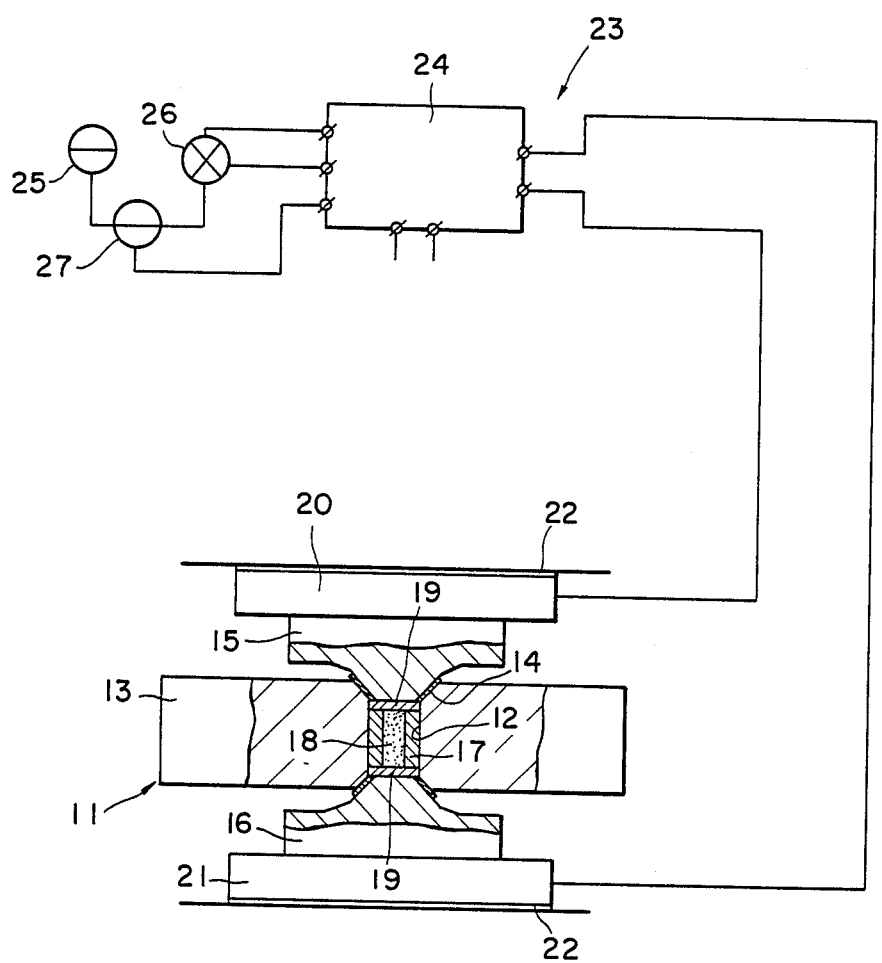
FIG. 2 is a diagrammatic sectional view of a mold unit.

As shown in FIG. 2, each mold unit 11 includes a mold body 13 with a cylindrical cavity 12 at the center thereof, and upper and lower anvils 15 and 16 which are fitted in conical surfaces formed around the upper and lower ends of the cylindrical cavity 12 through gaskets 14. In the particular example shown, a cylindrical sleeve 17 of carbon is fitted in the cylindrical cavity 12 to hold powdery raw material 18 therein. The cylindrical sleeve 17 is sandwitched between pressing plates 19, through which the upper and lower anvils 15 and 16 press the raw material 18 in the cylindrical cavity 12.

The upper and lower anvils 15 and 16 are connected to anvil support blocks 20 and 21, respectively, and an insulator 22 is interposed between the anvil support block 20 and upper platen 5, between the anvil support block 21 and lower platen 7 and between the adjacently located anvil support blocks 20 and 21 to insulate the mold units 11 from the upper and lower platens 5 and 7 and from each other.

The current supply control means 23 are connected separately to the respective mold units 11. As shown in FIG. 2, each one of the current supply control means 23 is constituted by a thyristor converter panel 24 connected to a power supply, a program setup unit 25, a power converter 26 and a power regulator 27, and connected to the upper and lower anvil support blocks 20 and 21 of the corresponding mold unit 11.

Figure 8:
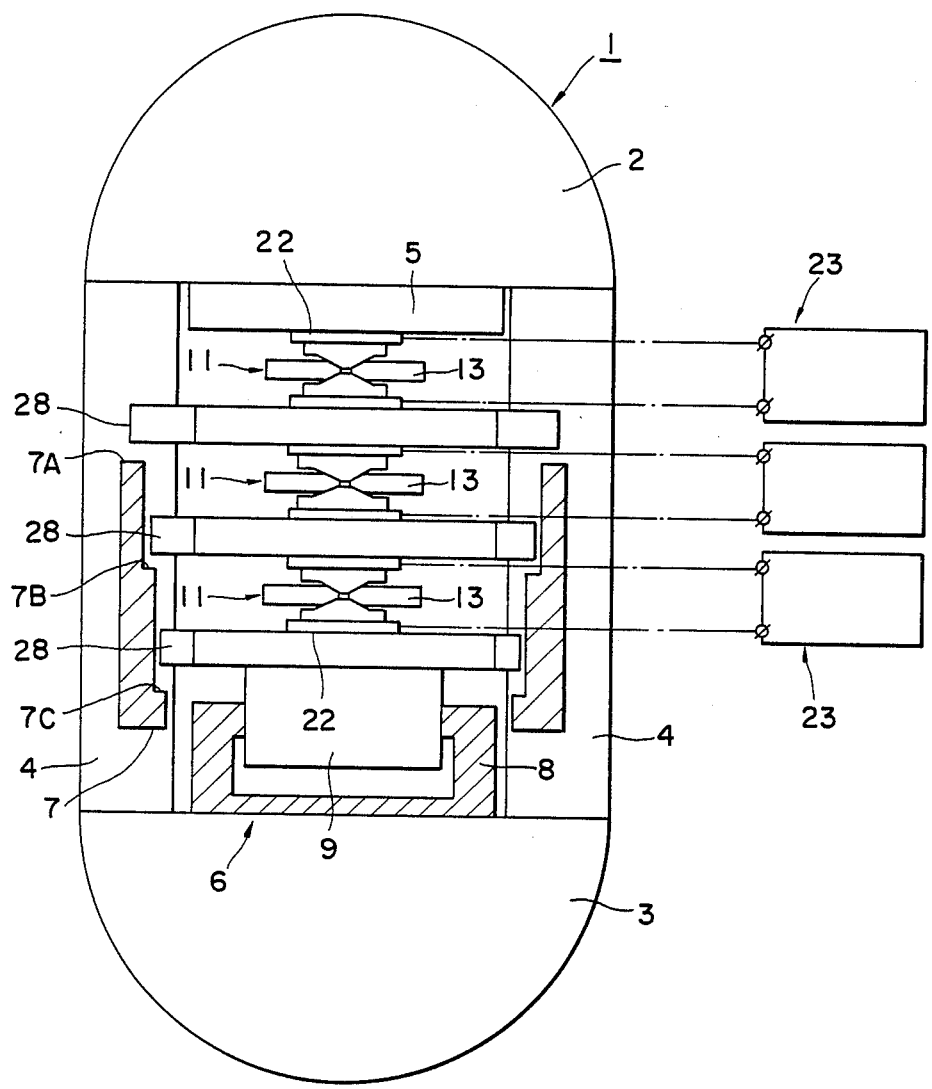
FIG. 8 is a view similar to FIG. 1 but showing another embodiment of the invention.

In the embodiment of FIG. 8, an intermediate platen 28 is interposed between adjacent mold units 11 to support the mold units 11 by the intermediate platens 28 and lower press blocks 7 which are positioned on opposite sides of the mold units 11. For this purpose, the intermediate platens 28 are protruded in a stepped fashion on the opposite sides of mold units 11 for engagement with stepped support surfaces 7A to 7C on the lower press blocks 7. In other respects, the embodiment of FIG. 8 employs the same component parts as in FIG. 1, as indicated by like reference numerals.

The press power which is required for a plurality of mold units 11 which are stacked in this manner is equivalent to the power for a single mold unit, for the following reasons.

Figure 3:
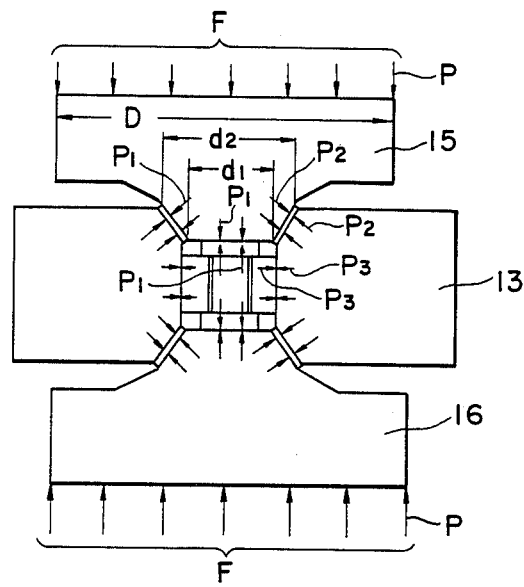
FIG. 3 is a diagrammatic illustration showing various forces occurring on and around a pressing operation.

FIG. 3 shows a phase of the pressing operation in which the raw material 18 has been pressed to some extent and the conical portions of the upper and lower anvils 15 and 16 just begin to contact the gaskets 14. In FIG. 3, the notation F indicates the pressing forces acting on the upper and lower surfaces of the anvils, P the surface pressure on the upper and lower sides of the anvils, P1 the surface pressure directly acting on the raw material, P2 the surface pressure compressing the gaskets, P3 the surface pressure of the cylinder, D the diameter of the pressure receiving surfaces of the anvils, d1 the diameter of the anvil end faces, and d2 the diameter of the conical portions of the anvils.

Figure 4:
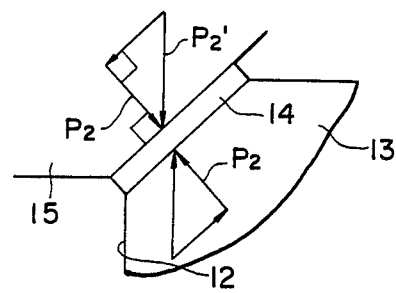
FIG. 4 is a diagrammatic illustration showing the details of a gasket portion.

The force of the anvils 15 and 16, $F=(\pi/4)D^2 \times P$, is equivalent to $(\pi/4)d1^2 \times P1 + (\pi/4)d2^2 - (\pi/4)d1^2) \times P2'$ wherein $P2'$ is a vertical component of the surface pressure P2 acting on the gasket as shown in FIG. 4.

In this state, the gaskets 14 lose thickness under the surface pressure P2, thus permitting the anvils 15 and 16 to wedge into the cylindrical cavity 12 to a degree corresponding to the loss of thickness. The raw material 18 under the pressure of $(\pi/4)d1^2 \times P1$ is likewise contracted in the vertical direction, so that the anvils 15 and 16 are further driven into the cylinder 12.

In a final stage of pressing, the upward and downward resisting forces of the raw material 18 plus the resisting forces of the gaskets 14 under the thinning forces balance with the pressing force F.

The pressures P1 and P2 vary depending upon the extent of packing of the raw material 18 and the material of the gaskets 14. However, irrespective of what degrees they resist the pressing force, there is continuously established the following relationship $$F=(\pi/4)D^2 \times P = [(\pi/4)d1^2 \times P1 + (\pi/4)d2^2 - (\pi/4)d1^2) \times P2'] \quad (1)$$

Figure 5:
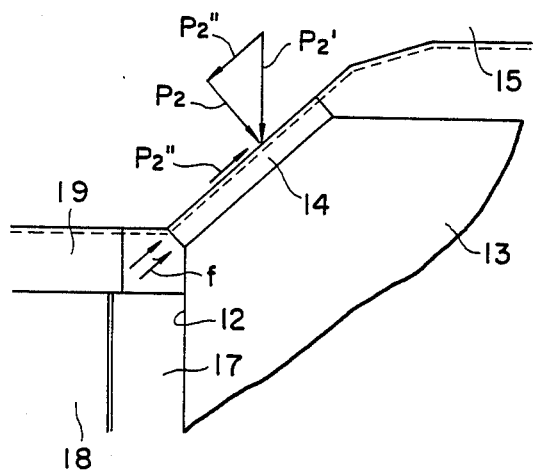
FIG. 5 is a diagrammatic illustration showing a modified gasket.

In FIG. 5, the gaskets which are gripped between the mold and anvils become thinner, so that the anvils 15 and 16 are lowered to the position indicated by the broken line. This means that the raw material 18 as well as the pressing plate 19 and sleeve 17 are contracted to the same extent. In this instance, it is inconceivable that the raw material 18 would produce a force f which is large enough to extrude the gasket 14 directly. Namely, the force f is imposed on the gaskets 14 when the press plate 19 is contracted.

The force f which is thus produced is resisted by the frictional force between the anvil 15 or 16 and the gasket 14, preventing the gasket 14 from being pushed out. For this resistance by the frictional force, the pressures P2 and P2' have to be increased to cope with increments in the force f. However, as implied by Eqn. (1), enhancement of the pressing action increases the proportion of P2' while reducing the proportion of P1.

The relationship of Eqn. (1) is established in spite of the occurrence of the above-mentioned phenomena in the final stage of the pressing operation. The variations in the proportions of P1 and P2' simply mean that the pressing force F is used to compress the gaskets 14 or to compress the raw material 18. The same applies to both a press with a single mold unit 11 or a press with three mold units 11 stacked as in the particular embodiment shown. Since the frictional forces are negated by the pressing force F, the three stacked mold units 11 do not require a triplicate pressing force.

Figure 6:
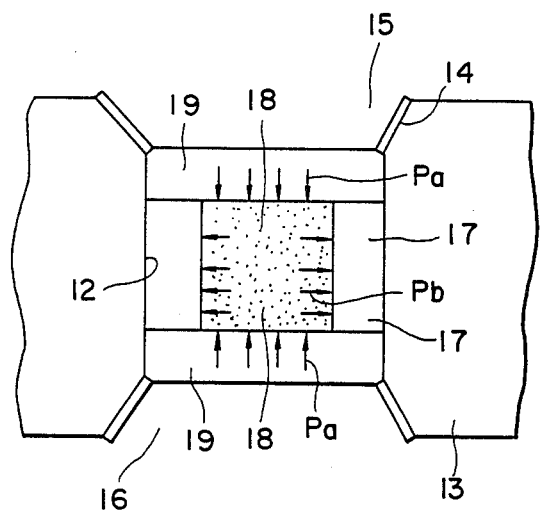
FIGS. 6 and 7 are diagrammatic illustrations explanatory of the forces occurring in and around a cylinder portion.
Figure 7:
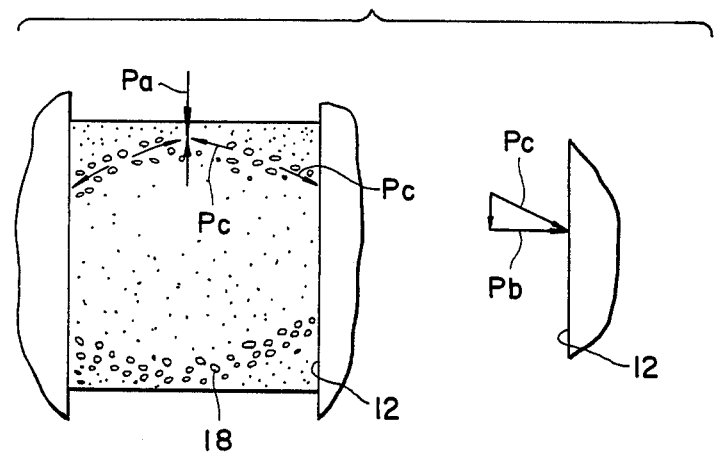

Referring to FIGS. 6 and 7, particles of the powdery raw material 18 which is compressed from opposite ends by the pressure Pa bring about the so-called bridging phenomenon as shown in FIG. 7, producing pressure Pc in oblique directions in proportion to the pressure Pa. The component Pc of Pb determines the pressure of the cylinder 12.

These forces are generated originally by application of the pressure Pa at the upper and lower ends and then by consolidated of the raw material. Despite the generation of the pressure Pb, there is no need for adding an extra force to the upward and downward pressing forces. That is to say, a plurality of mold units require the same pressing forces as a single mold unit.

According to a feature of the invention, a plurality of mold units are stacked one on another with the axes of respective being in alignment with the axis of the press, permitting production of a corresponding number of artificial diamonds or the like simultaneously by one pressing action to enhance the productivity.

Moreover, since the respective mold units are located in alignment with the axis of the press, it suffices to apply pressing power which is normally required by a single mold unit, and the raw material in the respective mold units can be pressed uniformly.

Further, the current on-off control means are connected separately to the respective mold units, so that the raw material in these mold units can be uniformly pressed and sintered.

According to another feature of the invention, an intermediate press block or blocks are provided to support the mold units from beneath in cooperation with the lower press block, to thereby hold the molds in a stabilized state during the pressing and sintering process and to lessen the burden of the lower platen or press block.

What is claimed as new and desired to be secured by Letters Patent of the United States is:

1. An ultra-high pressure molding apparatus, comprising:
    a press frame with top and bottom platens, at least one of said platens being movable toward the other by suitable actuating means;
    plural mold units stacked one on the other between said top and bottom platens; each of said mold units including mold means defining a cavity, opposed conical anvil members movable within said cavity and gasket means disposed between conical facing surfaces of said anvil members and said mold means; said anvil members being separated from each adjacent anvil member of adjacent other said mold units by an intermediate platen member; each of said mold units having separate electric means for heating molding material in each said cavity and a separate current control unit for each of said mold units; and
    insulator means between adjacent said mold units.

* * * * *